United States Patent Office 3,072,417
Patented Jan. 8, 1963

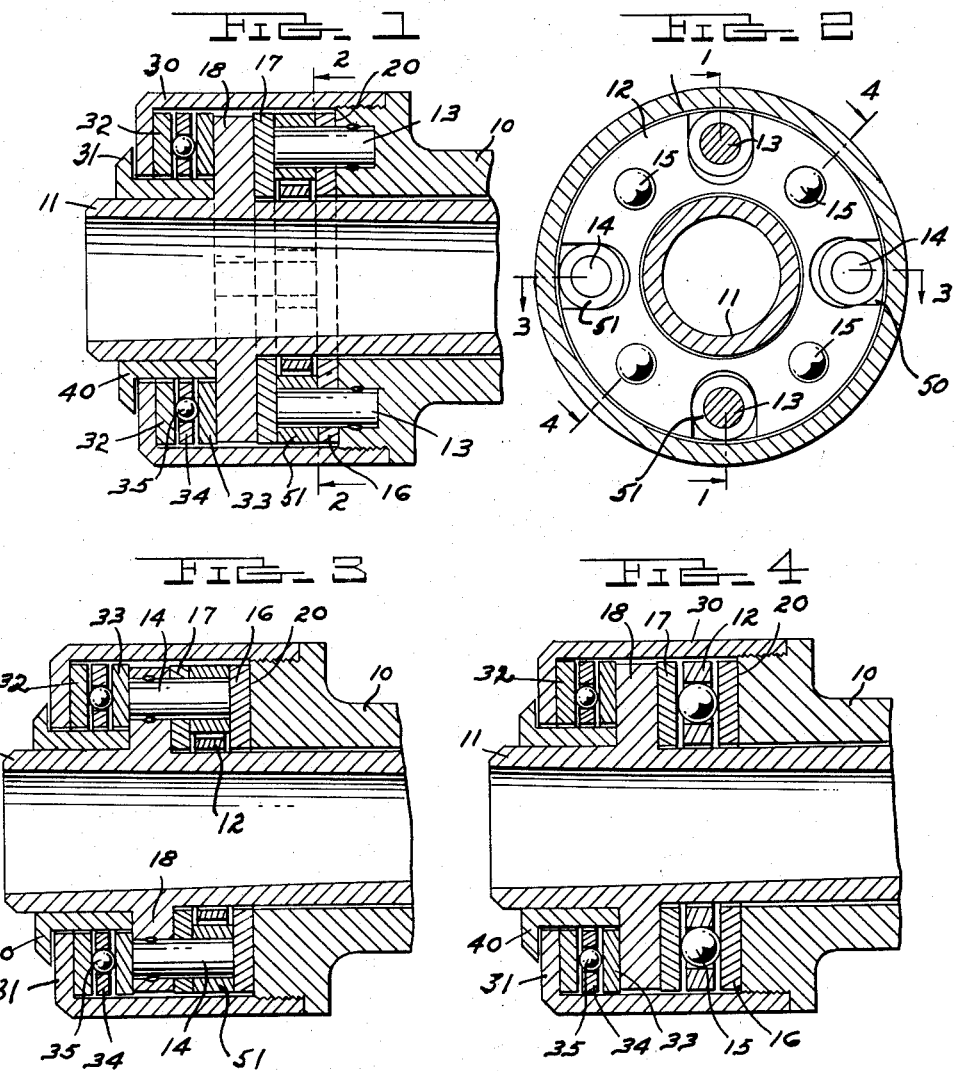

3,072,417
FLOATING TOOL HOLDER
Willard D. Ziegler, 8608 W. Outer Drive,
Detroit 19, Mich.
Filed Mar. 28, 1961, Ser. No. 98,808
2 Claims. (Cl. 279—16)

This invention relates to floating tool holders for permitting the tool to rotate on an axis other than that of the machine spindle as is well understood in the art and the invention more particularly pertains to easily removable and replaceable wear plates and rings which substantially eliminates wear thereby maintaining the floating action at peak efficiency.

Floating tool holders have been employed heretofore to facilitate centering the tool off the axis of the machine so as to facilitate accurate contact with a work piece such as in reaming and boring, however, the prior art devices have not proved entirely satisfactory inasmuch as they do not provide proper surfaces for eliminating wear and when wear occurs it substantially eliminates the free floating aspects of the tool holder.

With the foregoing in view, the primary object of the invention is to provide a floating tool holder which is simple in design and construction, inexpensive to manufacture, easy to use, and easy to repair and replace worn parts.

An object of the invention is to provide easily removable hardened wear plates and wear rings in the tool in contact with the floating suspension ball bearings which wear plates and rings can be quickly and easily removed and replaced in such a tool holder at far less costs than repairing the tool itself, and with no loss of time involved.

An object of the invention is to provide a floating tool holder assembly with easily removable and replaceable wear parts so that the tool man on the machine can make the repairs right on the machine avoiding the necessity of sending the tool holder back to the factory for repairs.

An object of the invention is to provide hardened wear plates adjacent the floating ball bearing assembly to insure that the hardened steel balls do not coin indentations in the contacting surface thereby eliminating pockets formed by the balls tending to hold the balls and therefore restrict the floating aspect of the tool holder.

An object of the invention is to provide hardened wear plates adapted to receive the axial thrust of a tool holder without the ball bearings adjacent thereto being capable of indenting or pocketing the wear plates themselves.

These and other objects of the invention will become apparent by reference to the following description of a floating tool holder embodying the invention taken in connection with the accompanying drawing in which:

FIG. 1 is a cross-sectional view of FIG. 2 taken on the line 1—1 thereof.

FIG. 2 is a cross-sectional view of FIG. 1 taken on the line 2—2 thereof.

FIG. 3 is a cross-sectional view of FIG. 2 taken on the line 3—3 thereof; and

FIG. 4 is a cross-sectional view of FIG. 2 taken on the line 4—4 thereof.

Referring now to the drawing wherein like numerals refer to like and corresponding parts through out the several views, the floating tool holder and easily replaceable wear plates and rings disclosed therein to illustrate the invention comprises, a hollow shank 10 adapted to be fixed in a machine, not shown, a head 11 floatingly disposed relative to the shank 10, a spider 12 disposed between the shank 10 and the head 11, pins 13 extending from the shank 10 toward the head 11, pins 14 extending from the head 11 toward the shank 10, the pins 13 and 14 both being in contact with the spider 12 for transmitting angular drive, a wear plate 16 adjacent the shank 10, a wear plate 17 adjacent the head 11, and ball bearings 15 disposed in the spider 12 contacting the wear plates 16 and 17 for transmitting axial forces between the shank 10 and the head 11.

More particularly, the shank 10 has a radial face 20 out of which the drive pins 13 extend and the head 11 has a head flange 18 which supports the drive pins 14. The pins 13 and 14 are surrounded with hardened sleeve rollers 51 in the area of the spider 12.

The spider 12 has radial slots 50 which extend inwardly and outwardly of the rollers 51 disposed on the pins, however, it will be noted that the rollers 51 are in tangential contact with the sidewalls of the slots 50 of the spider so as to impart angular drive between the spider and the pins.

It is to be further noted that the spider 12 is equipped with apertures receiving the ball bearings 15 so that the spider acts as a race for the ball bearings 15 and due to the fact that the spider 12 is thinner than the diameter of the ball bearings 15, all axially thrust between the shaft 10 and head 11 is directed via the ball bearings 15 and the hardened wear plates 16 and 17.

To prevent the head 11 moving axially outwardly relative to the shank 10 and to hold the device so described in assembled relationship, a cap 30 has a nose flange 31 overlying the hardened wear ring 32, wear ring 33, ball race 34, and ball bearings 35, and it is to be noted that the wear ring 33 abuts the head flange 18 on the side opposite the ball bearings 15 and that in axially withdrawing a tool carried by the head from a work piece, the shank 10 will withdraw the head 11 via the cap 30, flange 31, wear ring 32, ball bearings 35, wear ring 33, and head flange 18. The sleeve 40 is frictionally fitted on the head 11 and is in spaced relationship to the cap 30 and nose flange 31 and is also in space relationship relative to the wear rings 32 and 33 and the ball race 34 which are floatingly arranged and also in spaced relationship relative to the cap 30.

In operation, the driving force of the machine relative to the work piece is transmitted to the tool via the ball bearings 15 and their point contact on the hardened wear plates 16 and 17 and it is obvious that if the wear plates 16 and 17 were not hardened to a high degree that the balls 15 would imbed themselves therein causing indentations which would pocket the balls thereby preventing free movement of the balls and consequently free movement of the head 11 relative to the shank 10.

It has further been found when no hardened wear plates are used, that the shank 10 and head 11 cannot be properly hardened in the desired areas and as a result the life of the tool as a free floating fixture is substantially short due to the fact that, as soon as the balls pit or pocket the head flange 18 or the shank face 20, the floating arrangement of the head 11 relative to the shank 10 is decreased as the balls seat themselves in the pockets and effect a mechanical engagement thereby eliminating the floating action.

This is also true of the hardened wear rings 32 and 33 adjacent the balls 35 in that the cap nose flange 31 and the flange 18 cannot be desirably hardened in the area of the balls 35.

However, with the hardened wear plates 16 and 17 and the hardened wear rings 32 and 33 a long life is assured the tool due to the fact that these wear rings can be specifically hardened in the desired areas of the balls thereby preventing any indentations or pockets and the like forming so that the ball bearings are free to rotate at all times.

In the event of wear plate deterioration after long and arduous use, it is obvious that the device can be easily disassembled by removing the cap 30 from the shank 10 and the wear plates easily removed and new wear plates easily inserted in all instances right on the job.

Conversely, if the wear plates were not present in the tool, the entire tool has to be disassembled and re-surfaced and re-hardened and this cost is substantially prohibitive relative to merely replacing the wear plates.

Moreover, the wear plates are highly satisfactory in operation as they can be properly hardened, whereas the head and shank cannot be entirely hardened nor can selected areas of either one be satisfactorily hardened.

Also the wear plates not only provide means of reducing the cost of repairs but also the initial cost of the tool due to the fact that hardening selected portions of either the shank or the head is extremely expensive and to repair same is even more expensive.

Although but a single embodiment of the invention has been shown and described in detail, it is obvious that many changes may be made in the size, shape, detail and arrangements of the various elements of the invention within the scope of the appended claims.

I claim:

1. A tool holder for floatingly supporting a tool relative to a machine comprising, a shank fixable in a machine; said shank having a radial face portion; first drive pins extending endwise outwardly from said shank face portion, a first hardened annular wear plate disposed on said shank face portion having apertures surrounding said first drive pins, a hollow tool holding head loosely disposed adjacent said shank having a radial flange spaced from said shank face portion, second drive pins extending endwise inwardly from said head flange, a second hardened annular wear plate disposed on said head flange having apertures surrounding said second drive pins, hardened sleeve rollers on all said pins outwardly of said wear plates, a spider disposed between said wear plates in spaced relationship to both to avoid transmission of axial forces therebetween; said spider having apertures; hardened ball bearings in said spider apertures contacting both said wear plates for transmitting axial forces therebetween; said spider having radial slots receiving all said drive pins and rollers thereon; said spider radial slots extending radially both inwardly and outwardly of said pins and rollers to permit radial inward and outward movement of said spider relative to said pins and to permit radial inward and outward movement of said head pins and rollers relative to said shank pins and rollers; said relative radial movement between said parts disposing said head universally movable in a plane relative to said shank for centering said head and a tool held thereby relative to a workpiece on an axial center off the axial center of said shank and a machine spindle housing same; said spider slots being in tangential contact with said rollers for transmitting angular drive from said shank pins to said head pins via said spider; said hardened wear plates preventing said hardened ball bearing from coining indentations in said shank face and said head flange under axial forces thereby eliminating indentions that pocket the ball bearings in mechanical interlock and prevent the constant free movement of said balls relative to both said shank and said head flange when said head is rotating about an axis off the axis of said shank thereby permitting unrestricted constant relative motion between said balls and said head flange and said shank face; a cap threaded on said shank overlying said head flange in spaced relationship; said cap having a nose flange spaced from said head flange on the side thereof opposite said spider; a hardened wear ring adjacent said cap nose flange, a second hardened wear ring adjacent said head flange, hardened ball bearings disposed between said rings, and a sleeve friction fitted on said head having a flange spaced from said cap nose flange; said sleeve lying within said rings in spaced relationship thereto; said cap nose flange, wear rings, head flange and second ball bearings providing means for axially moving said head in a direction tending to separate said shank from said head; said hardened wear rings contacting second ball bearings preventing said second ball bearings from coining a track in said head flange and cap nose flange so as to permit unrestricted universal movement in a plane between said head and said shank.

2. A tool holder for floatingly supporting a tool relative to a machine comprising, a shank fixable in a machine; said shank having a radial face portion; first drive pins extending endwise outwardly from said shank face portion, a first hardened annular wear plate disposed on said shank face portion having apertures surrounding said first drive pins, a tool holding head loosely disposed adjacent shank having a radial flange spaced from said shank face portion, second drive pins extending endwise inwardly from said head flange, a second hardened annular wear plate disposed on said head flange having apertures surrounding said second drive pins, hardened sleeve rollers on all said pins outwardly of said wear plates, a spider disposed between said wear plates in spaced relationship to both to avoid transmission of axial forces therebetween; said spider having apertures; hardened ball bearings in said spider apertures contacting both said wear plates for transmitting axial forces therebetween; said spider having radial slots receiving all said drive pins and rollers thereon; said spider radial slots extending radially both inwardly and outwardly of said pins and rollers to permit radial inward and outward movement of said spider relative to said pins and to permit radial inward and outward movement of said head pins and rollers relative to said shank pins and rollers; said relative radial movement between said parts disposing said head universally movable in a plane relative to said shank for centering said head and a tool held thereby relative to a workpiece on an axial center off the axial center of said shank and a machine spindle housing same; said spider slots being in tangential contact with said rollers for transmitting angular drive from said shank pins to said head pins via said spider; said hardened wear plates preventing said hardened ball bearings from coining indentations in said shank face and said head flange under axial forces thereby eliminating indentions that pocket the ball bearings in mechanical interlock and prevent the constant free movement of said balls relative to both said shank and said head flange when said head is rotating about an axis off the axis of said shank thereby permitting unrestricted constant relative motion between said balls and said head flange and said shank face.

References Cited in the file of this patent

UNITED STATES PATENTS

| 2,042,648 | Ziegler | June 2, 1936 |
| 2,533,758 | Better et al. | Dec. 12, 1950 |
| 2,981,544 | Better | Apr. 25, 1961 |